US010171768B2

(12) United States Patent
Rakshit

(10) Patent No.: US 10,171,768 B2
(45) Date of Patent: Jan. 1, 2019

(54) CURVE PROFILE CONTROL FOR A FLEXIBLE DISPLAY

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 14/819,628

(22) Filed: Aug. 6, 2015

(65) Prior Publication Data

US 2017/0041568 A1    Feb. 9, 2017

(51) Int. Cl.
*H04N 5/64* (2006.01)
*G06F 3/01* (2006.01)
*G06F 3/0346* (2013.01)

(52) U.S. Cl.
CPC ............... *H04N 5/64* (2013.01); *G06F 3/013* (2013.01); *G06F 3/0346* (2013.01); *G09G 2320/028* (2013.01); *G09G 2320/068* (2013.01); *G09G 2320/08* (2013.01); *G09G 2354/00* (2013.01); *G09G 2380/02* (2013.01)

(58) Field of Classification Search
CPC ........................ G09G 2380/02; G09G 2320/08
See application file for complete search history.

(56) References Cited

U.S. PATENT DOCUMENTS

| | | | |
|---|---|---|---|
| 7,576,750 B2 | 8/2009 | Eckhardt et al. | |
| 8,715,079 B1 | 5/2014 | Loose | |
| 8,958,026 B2 | 2/2015 | Park et al. | |
| 2001/0048377 A1 | 12/2001 | Mochizuki et al. | |
| 2004/0025112 A1 | 2/2004 | Chasen et al. | |
| 2006/0156228 A1 | 7/2006 | Gallo et al. | |
| 2006/0274060 A1 | 12/2006 | Ni et al. | |
| 2008/0062164 A1 | 3/2008 | Bassi et al. | |
| 2009/0019401 A1 | 1/2009 | Park et al. | |
| 2010/0056223 A1 | 3/2010 | Choi et al. | |
| 2012/0235893 A1 | 9/2012 | Phillips et al. | |

(Continued)

FOREIGN PATENT DOCUMENTS

CN    103854571 A    6/2014

OTHER PUBLICATIONS

Office Action in U.S. Appl. No. 15/067,906 dated Feb. 6, 2017, 49 pgs.

(Continued)

*Primary Examiner* — Gims S Philippe
*Assistant Examiner* — Mainul Hasan
(74) *Attorney, Agent, or Firm* — Michael O'Keefe; Matthew M. Hulihan; Heslin Rothenberg Farley & Mesiti PC

(57) ABSTRACT

Facilities are provided herein for automatically determining and applying curve profiles to flexible displays. An example process includes obtaining content to be presented on a flexible display, automatically determining a curve profile to apply to the flexible display in association with presentation of the content on the flexible display, the automatically determining being based at least in part on an analysis of the content to be presented, and applying the curve profile to the flexible display in association with the presentation of the content on the flexible display.

16 Claims, 7 Drawing Sheets

(56) References Cited

U.S. PATENT DOCUMENTS

| | | | |
|---|---|---|---|
| 2013/0222432 A1* | 8/2013 | Arrasvuori | G06F 3/0487 345/660 |
| 2014/0015402 A1 | 1/2014 | Ahn et al. | |
| 2014/0104244 A1* | 4/2014 | Baldwin | G06F 1/1626 345/204 |
| 2014/0354791 A1* | 12/2014 | Lee | G06K 9/00228 348/77 |
| 2015/0049090 A1 | 2/2015 | Kim et al. | |
| 2016/0154564 A1 | 6/2016 | Chiang et al. | |
| 2016/0187745 A1 | 6/2016 | Jin | |

OTHER PUBLICATIONS

CinemaScope, Wikipedia, page modified Jan. 3, 2016, https://en.wikipedia.org/wiki/CinemaScope.

Anamorphic Format, Wikipedia, page modified Dec. 24, 2015, https://en.wikipedia.org/wiki/Anamorphic_format.

EL15: Why Were Old CRT TVs Curved?, reddit.com, last accessed Feb. 12, 2016, https://www.reddit.com/r/explainlikeimfive/comments/254nqy/eli5_why_were_old_crt_tvs.

Fisheye Lens, Wikipedia.com, site accessed Feb. 12, 2016, https://en.wikipedia.org/wiki/Fisheye_lens.

Technology . . . or magic? Samsung shows off video of transparent, flexible screen—with 3D so real it looks like you can touch it, Daily Mail, Dec. 7, 2011, http://www.dailymail.co.uk/sciencetech/article-2070741/Samsungs-transparent-flexible-screen-3D-real-looks-like-touch-it.html.

"Modeling—Geometry Types (Refinements) (3D Animation Using Maya)", what-when-how, http://what-when-how.com/3d-animation-using-maya/modeling-geometry-types-refinements-3d-animation-using-maya/.

List of IBM Patents or Patent Application Treated as Related, Mar. 14, 2016.

Dante D'Orazio, "Samsung Reveals a Wild Bendable TV Prototype and its Curved, 105-inch Ultra HD TV", Jan. 6, 2014, 4 pages.

John Archer, "Curved TVs: 6 Reasons You Should Buy One—And 6 More Why You Shouldn't", http://www.forbes.com/sites/johnarcher/2014/08/13/curved-tvs-6-reasons-you-should-buy-one-and-6-more-why-you-shouldnt/.

John Archer, "Curved TVs: The Pros and Cons", May 20, 2015, http://www.trustedreviews.com/opinions/curved-tvs-the-pros-and-cons.

Schulte-Pelkum et al. "Screen curvature does influence the perception of visually simulated ego-rotations", presented at VSS 2003, Sarasota, http://www.kyb.tuebingen.mpg.de/fileadmin/user_upload/files/publications/pdfs/pdf2024.pdf.

Schulte-Pelkum et al. "Screen curvature does influence the perception of visually simulated ego-rotations", presented at VSS 2003, Sarasota, http://www.researchgate.net/publication/216055702_Screen_curvature_does_influence_the_perception_of_visually_simulated_ego-rotations.

Aseem Girkar, "LG 4K Flexible Curved OLED TV Launched", GizCrunch, Jan. 7, 2014, http://gizcrunch.com/2014/01/lg-4k-flexible-curved-oled-tv-launched-ces-2014/.

"Electroactive polymers", Wikipedia, https://en.wikipedia.org/wiki/Electroactive_polymers.

Raghu Das, "Printed, Flexible and Organic Electronics Report", IDTechEx, http://www.idtechex.com/research/reports/electroactive-polymers-and-devices-2013-2018-forecasts-technologies-players-000347.asp.

"Electroactive Polymers", Technische Universitat Darmstadt, http://www.emk.tu-darmstadt.de/en/mems/research/electroactive-polymers/.

"Electroactive Polymer 'Artificial Muscle'", SRI International, http://www.sri.com/engage/products-solutions/epam.

Office Action in U.S. Appl. No. 15/067,906 dated Aug. 9, 2017, 45 pgs.

\* cited by examiner

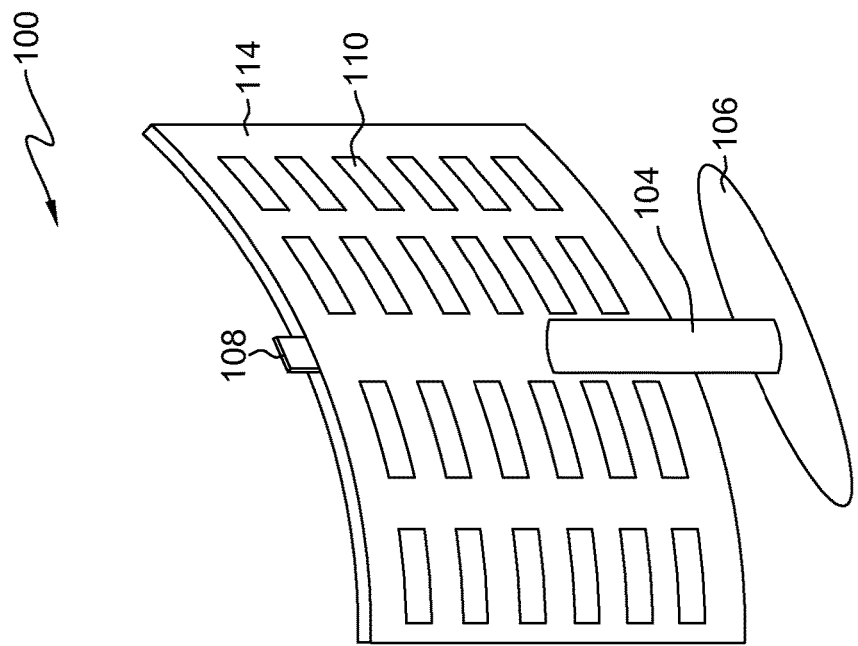
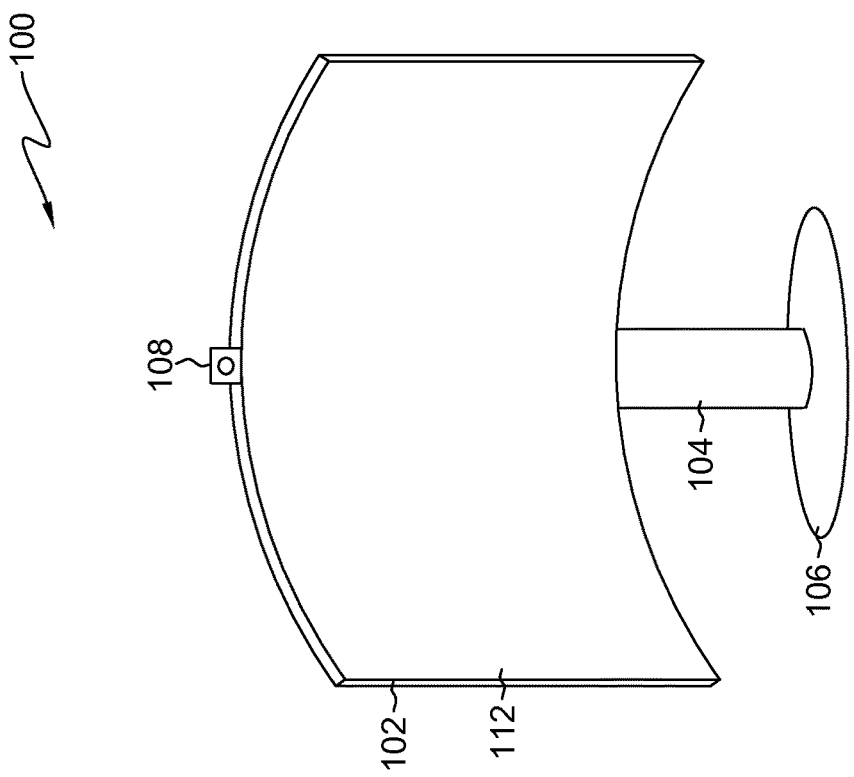

CURVE PROFILE CONTROL FOR A FLEXIBLE DISPLAY

BACKGROUND

Flexible displays provide the ability to at least partially curve, roll, bend, flex, fold or otherwise distort the physical character of the display surface. These displays are increasingly being incorporated into electronic devices including, but not limited to, curved screen televisions, computer monitors, and smartphone or tablet displays. Advantages provided by a flexible display as compared to traditional displays include enhanced sense of depth to the content on the display, improved user immersion (the perception that the user is physically present in the scene of the content), improved image contrast, unified viewing distance, and wider effective viewing angles, as examples. Existing technology, however, fails to maximize curve profile versatility to optimize user experiences.

SUMMARY

Shortcomings of the prior art are overcome and additional advantages are provided through the provision of a method that includes obtaining content to be presented on a flexible display; automatically determining a curve profile to apply to the flexible display in association with presentation of the content on the flexible display, the automatically determining being based at least in part on an analysis of the content to be presented; and applying the curve profile to the flexible display in association with the presentation of the content on the flexible display.

Further, a computer program product including a computer readable storage medium readable by a processor and storing instructions for execution by the processor is provided for performing a method that includes: obtaining content to be presented on a flexible display; automatically determining a curve profile to apply to the flexible display in association with presentation of the content on the flexible display, the automatically determining being based at least in part on an analysis of the content to be presented; and applying the curve profile to the flexible display in association with the presentation of the content on the flexible display.

Yet further, a computer system is provided that includes a memory and a processor in communications with the memory, wherein the computer system is configured to perform a method including: obtaining content to be presented on a flexible display; automatically determining a curve profile to apply to the flexible display in association with presentation of the content on the flexible display, the automatically determining being based at least in part on an analysis of the content to be presented; and applying the curve profile to the flexible display in association with the presentation of the content on the flexible display.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 1A-1B depict an example flexible display with actuators for effecting a desired curve profile, in accordance with aspects described herein;

DETAILED DESCRIPTION

Figure 2A:
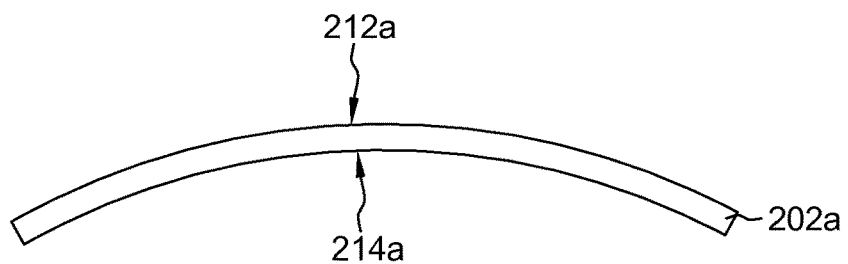
FIGS. 2A-2D depict example curve profiles for applying to a flexible display in accordance with aspects described herein.

Aspects described herein provide enhancements in curve profile control for a flexible display. Automatic curve profile determination and application is provided, in part, by analyzing content to be presented and the context under which the content is presented.

The degrees or magnitudes of curvature applied to the various portions, or curvature areas, of a flexible display are referred to collectively herein as a curve profile, and play an important role in enhancing a user experience. An appropriate curve profile can favorably impact a viewer's perception of the content. As additionally described herein, a viewer's position proximate the flexible display can play a role in determining the appropriate curve profile to apply.

Various manual or remote-control-operated approaches exist for a viewer to adjust a display curvature, but these adjustments are typically initiated by the viewer and dictated by user input that defines for the device the curve to be applied. A viewer may not have adequate knowledge or be familiar enough with the content to define the most desirable or effective curve to apply to the device given the many factors that can play a role in such a determination. These factors include the nature or character of the content to be presented, the current physical position(s) of viewer(s), and viewer preferences, among other factors. Robust methods and systems are needed by which curve profiles of a flexible display can be automatically determined and applied based on these and other factors.

Aspects described herein provide automatic control of curve profile determination, selection, and application in association with presentation of content on a flexible display. In some embodiments, determination and application of the curve profile(s) to apply in association with presentation of content on the display are based on an analysis of the content to be presented. In some embodiments, the determination and application are based further on viewing location(s) of viewer(s) of the content. In further embodiments, curve profile determination and application may be based on recommendations included with content delivery and/or provision. Example recommendations include those made by users who upload and share content on social media platforms.

Actuators may be used to effect curvature changes In particular embodiments, multiple actuators, such as electroactive polymer (EAP) strips are affixed to a backside of the flexible display. An EAP strip is reactive to the application of an electric field in that the EAP strip changes size and/or shape when stimulated by the electric field. An EAP strip can be controllably deformed when an appropriate electric field is applied to it. By controllably deforming a collection of EAP strips affixed to the backside of a flexible display, varying magnitudes of curvature are applied to different curvature areas of the flexible display in order to provide the flexible display with a desired curve profile for content presentation.

Software installed in the flexible display or a computer system associated therewith, as examples, can analyze content to be displayed or that is being displayed and accordingly determine and apply curve profile(s) to the flexible display when presenting the content. The curve profile(s) may vary dynamically with different images, scenes, audio, etc. of the content and other factors, such as the content under which the content is presented. A particular curve profile to apply to content may be identified, in some embodiments, based on one or more of dynamic and real-time analysis of the content as it is received or played, predefined knowledge based in the device or a content server that maps scene and context of the content to various established curve profiles, or recommended curve profile(s), as examples.

Viewer positioning as determined using a camera of the flexible display or of another device in the environment is used in some embodiments in the determination of the curve profile to apply and/or in tailoring a determined curve profile to apply. In a particular example, a camera installed in the flexible display identifies location(s) of viewer(s), and this is used to identify the viewing angle(s) from which the content is being viewed. The determined curve profile(s) to apply may be tailored based on these viewing angle(s).

FIGS. 1A-1B depict an example flexible display with actuators for effecting a desired curve profile, in accordance with aspects described herein. Flexible display 100 includes display screen 102 having a frontside 112 and a backside 114. Display screen 102 may be any display device that can present information in visual form and may present content in other forms, such as audio. Examples include, but are not limited to, "electronic paper" or a thin, flexible plastic substrate incorporating organic light emitting diode (OLED) technology. Display screen 102 is coupled to arm 104, which is attached to base 106 to provide a stand for the flexible display. In this example, flexible display 100 also includes a camera 108, which may be used to detect and track viewer position for use in determining appropriate curve profile(s) to apply, as described herein.

Multiple actuators 110 are affixed-to or otherwise provided at backside 114 of flexible display screen 102. In this example, the actuators 110 are electroactive polymer (EAP) strips. Actuators 110 may be actuated by the application of signals. EAP strips, for example, may be deformed to an appropriate extent based on stimulation by an appropriate electric field.

The actuation effects a bend or curve to the flexible display 100, e.g. the flexible display screen 102 thereof. The particular curve profile(s) to apply to the flexible display dictate the magnitude and positioning of the bend/curves to apply to the flexible display, which in turn dictate the signals (electric fields in the case of EAP strips) to be applied in order to deform the flexible display into exhibiting the desired curve profile(s).

As is described in further detail below, application of a curve profile may be based on detecting a curvature change event. Upon detecting such an event, a curve profile is applied to the flexible by providing the appropriate signals to the actuators in order to effect the curve. In the case of EAP strips, an electric field is created around the EAP strips, which causes them to bend.

Figure 2B:
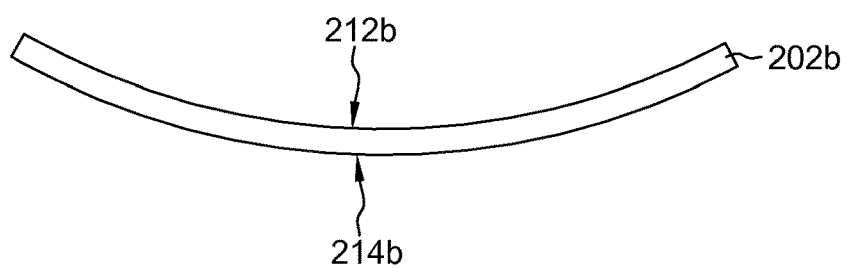

A curve profile defines the positioning and magnitude/shape of the curve(s) to apply to the flexible display. FIGS. 2A-2D depict example curve profiles for applying to a flexible display in accordance with aspects described herein. The curve profiles are shown by way of an overhead view. FIG. 2A shows an example curve profile of a flexible display 202*a* exhibiting a convex curve profile relative to a viewer, in which frontside 212*a* of the device exhibits a convex curve and backside 214*a* exhibits a concave curve. FIG. 2B shows an example curve profile of a flexible display 202*b* exhibiting a concave curve profile relative to a viewer, in which frontside 212*b* of the device exhibits a concave curve and backside 214*b* exhibits a convex curve.

Figure 2C:
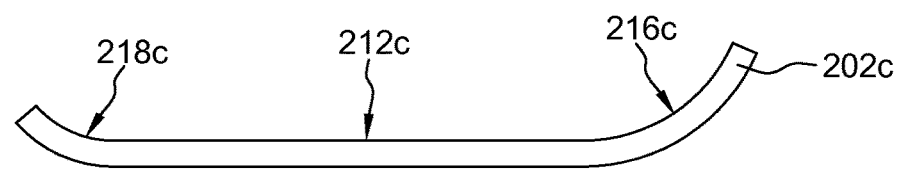

FIG. 2C shows an example curve profile of a flexible display 202*c* in which varying magnitudes of curvature are exhibited in different portions of the display. Here, relatively large magnitudes of curvature (216*c*, 218*c*) are exhibited toward each end of frontside 212*c* of the display, while a relatively small magnitude of curvature is exhibited at the center portion of frontside 212*c*.

Figure 2D:
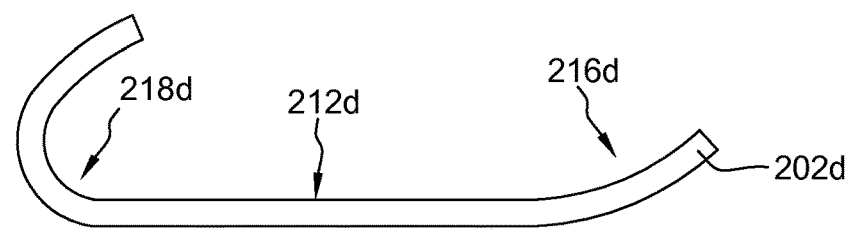

FIG. 2D shows an example curve profile of flexible display 202*d* that resembles the curve profile of FIG. 2C except that the magnitude of curvature 218*d* toward one end of frontside 212*d* is greater than the magnitude 216*d* at the other end of frontside 212*d* of the display. The result is an asymmetric curve profile unlike the curve profiles of FIGS. 2A-2B. It should be understood that although FIGS. 2A-2D depict relatively basic curve profiles with only a few distinct curves across the display, a display may include any number of curves at any number of portions of the display.

In some examples, the amount, or magnitude, of curvature applied to a given area is dependent on a magnitude and direction of an electric field(s) around the EAP strips. The signal(s) or electric field(s) may be controlled programmatically to change the curve profile of the display.

Different curve profile(s) may be applied for different content. Different content can refer not only to separate media files, programs, videos, streams, channels, or the like, but also to different images, segments, scenes, portions, etc. within a given media file, program, video, stream, channel, etc. In this regard, one portions/set of image(s) of a piece of content (such as a single video or collection of images) may be best displayed using a curve profile that differs from the best curve profile to use or another portion/set of image(s) of the piece of content.

Figure 3:
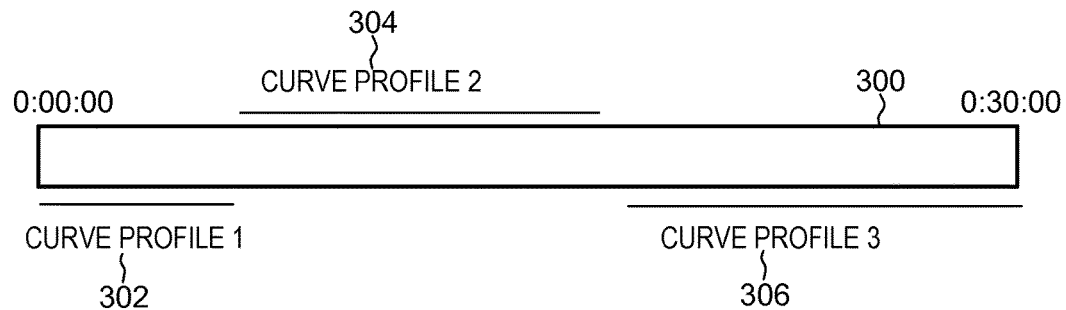
FIG. 3 depicts an example in which different curve profiles to apply in association with presentation of content are associated with different portions of that content, in accordance with aspects described herein.

FIG. 3 depicts an example in which different curve profiles to apply in association with presentation of content are associated with different portions of that content, in accordance with aspects described herein. FIG. 3 illustrates that the curve profile of the flexible display changes across the time period for presentation of the piece of content. Content 300, a video for instance, has three non-overlapping portions for which three different curve profiles are to be applied. The beginning 6 minutes of the video are presented with curve profile 1 (302) applied to the flexible display, followed by the next 12 minutes with curve profile 2 (304) applied to the flexible display, followed by the final 12 minutes with curve profile 3 (306) applied to the flexible display.

The transition from one curve profile to another may be based on a curvature change event, which can be any desired event. The event may be related to context or characteristic(s) of the content, such as scene changes, or may be unrelated to the characteristics of the content, such as detection of a change in viewer position relative to the flexible display (explained further below).

In some examples, the differing portions of the content for which the appropriate curve profiles are to be applied are determined prior to presenting the content on the flexible display. For instance, the content may be analyzed prior to a presentation of the content and that analysis can inform the curvature change events and optionally the particular curve profiles to apply in presenting the particular portions of the content. These events/profiles can be tagged to the different portions of the content and playback of the content can read the change events and determine/apply the curve profile at the appropriate times.

In other examples, the differing portions of the content and the appropriate curve profiles to apply are determined dynamically and in real-time, i.e. as the content is being presented on the flexible display. In these cases, the flexible display or an associated computer system analyzes the content in real-time to identify curvature change events and apply an appropriate curve profile. This is likely to be the case when the content being presented features live, or near-live, broadcasts.

Curve profile selection and/or adjustment can be controlled based on a set of predefined rules that dictate changes in the curve triggered by transitions between portions of the content. Installed software can identify the portions of the display screen where a curve is to be adjusted and an extent of the adjustment needed. This informs the actuation(s) that is/are needed to effect the appropriate adjustment. In some embodiments, analysis of the content is performed as the content is being presented on the display and adjustments are dynamically determined and applied in order to provide appropriate, varying visual enhancements through an evolving display curvature. Intelligence is provided to programmatically identify, based on the specific content being displayed, the signal(s) to apply to various portion(s) of the display to achieve desired levels of curvature across the display. In some examples, video/image content analysis software dynamically identifies the portions of the display at which an appropriate curvature is to be provided and the specific amount or radius of curvature to apply to each of those portions. Content analysis can include contextual analysis of the content to identify characteristics of the content. The characteristics can be compared to pre-defined rules to inform a curve profile to apply.

In one example, the contextual analysis identifies a particular image or scene that focuses on objects that are relatively close to the viewer's point of view. Based on this and the predefined rules, the determined curve profile may be a concave profile similar to that of FIG. 2B, to provide the most appropriate overall representation of the scene. In another example, the contextual analysis identifies a particular image or scene that focuses on a large, distant object, such as an image of Earth taken from outer space, and the determined curve profile is a convex profile similar to that of FIG. 2A.

Predefined rules may be used in the determination of an appropriate curve profile. These rules may define curve profiles and include mappings of particular content characteristics to those defined curve profiles. For instance, a predefined rule may dictate that team sporting event content, such as football and hockey games, is to be presented with a curve profile as in FIG. 2C. In some examples, the predefined rules are provided by a content service provider, such as a cable company, or the content creator or provider itself, such as a movie studio. For content delivered in a streaming fashion, such as cable or satellite television content, the predefined rules can be provided as part of the communication from the stream provider or the predefined rules may be built by a computer system associated with the flexible display.

Predefined rules may be built, in some examples, based on compiling viewer curve profile preferences given specific content or content type. As an example, a system can monitor a given user's preferences to learn over time based on the user's manual adjustments or specifications about the applicable curve profiles, or based on the user refraining from changing a delivered curve profile, what curve profile is preferred for a given piece of content or content type. In this manner, the device can monitor how users adjust the curvature applied to different content being presented and build up 'usage patterns' that can be automatically applied to content subsequently presented. The system may in this manner be trained based on user's viewing data.

The preferences may be of varying granularity. In one example, a preference is directed to a specific piece of content, such as a particular movie. In another example, the preference is directed to a specific type or characteristic(s) of the content, such as sporting events, music videos, or animated shows, as examples. Additionally, predefined rules can utilize any appropriate contextual parameters that may be ascertained when content is to be presented. In some examples, the predefined rules are specific to a type or size of flexible display on which the content is presented. User profiles may be established and curve profile determination for a particular piece of content for a particular user can use the rules established for that user's profile. In some embodiments, user preferences are aggregated across many users to establish a 'consensus' curve profile. In this regard, predefined rules may be established by a content provider, content creator, or service provider, such as a cable company, based on analysis of user preferences across its customers. Additionally or alternatively, manufacturers of the flexible display or devices that include the flexible display may monitor and aggregate curve profile adjustments made by their customers to build and supply predefined rules to the devices for later automatically determining appropriate curve profiles to apply. Predefined rules may be built, obtained, stored, and/or maintained by a flexible display, a video server, content provider, content creators, content service provider, or any other entity.

Curve profiles may be automatically determined based on recommendations provided with, or otherwise associated with, the content. A recommendation is akin to a predefined rule that is specific to a given piece of content. The recommendation provides a recommended curve profile or guidance as to curve profile properties and may be provided in metadata of the content or separate from the content. In a particular example, the recommendation is provided via a social network, and the content may or may also not be posted to the social network with the recommendation. By way of specific example and not limitation, a user may record a video with a smartphone and post the video to a social network together with a recommended curve profile to apply to the flexible display. Alternatively, a user may post a recommended curve profile for a particular piece of content that others obtain outside of the social network, such as a movie available through a streaming service.

Thus, based on the viewing experiences for different users, the users can recommend different curve profiles on a social networking site. This may be useful when users discover interesting or appealing effects by experimenting with different curve profiles. A user may find that a particular curve profile produces a better three-dimensional effect/illusion for the content compared to another curve profile that was selected or suggested, as an example, and may share that in the form of a recommended curve profile. As noted, curve profile recommendations can be part of the content, e.g. in the metadata of a content file, in which case software of the flexible display or a device connected or in communication with the flexible display (such as a cable box or streaming device) can read the recommendation to determine the curve profile to apply, and apply the appropriate signals to the actuators to provide the curve profile.

Curve profile recommendations may also be associated with specific portions of content. This enables users to selectively provide a recommendation with respect to a particular portion of the content, a scene of a movie for example, without overriding a more general curve profile suggestion applicable to the content as a whole or to other portions of the content.

Additionally or alternatively, several recommendations may be associated with a portion of content and the user or system may automatically select one of the recommendations to apply in presenting the content. In some embodiments, a rating or popularity indication is maintained with one or more recommendations to assist a user or system in selecting the curve profile to apply.

In some embodiments, a curve profile to apply as suggested by a predefined rule and/or recommendation may yield a provisional curve profile to apply, subject to modification or tweaking. In this regard, rule(s) and recommendation(s) are not necessarily authoritative. For instance, positioning of viewer(s) may be considered in determining the curve profile to apply. Viewer positioning can therefore provide additional context for the determination of the curve profile(s) to apply.

A camera or other sensing device installed in/with the flexible display (such as in the example of FIGS. 1A and 1B) or otherwise present in the viewing environment can identify positioning of viewer(s) of the content in the area proximate the display. This positioning may be used to determine number of viewers, distance from the flexible display, and viewing angle(s). Appropriate curve profile(s) can then be determined based on this.

Rules informing the curve profile selection based on these viewer characteristics can be established. For instance, rules may be built based on historical curve profile selection (either by the user(s) or other entities), recommendations, suggestions by content distributors or providers, etc.

Viewer positioning therefore provides another contextual input on which the determination of a curve profile may be based. In some examples, this input is considered in conjunction with other inputs, such as predefined rules and/or recommendations. Weighting may be applied to each of these inputs in order to vary their respective level of influence on the final curve profile to apply. Alternatively, the viewer location input (or any other input to the determination of a curve profile to apply) may serve as modifying input to modify a provisionally selected curve profile. In this manner, predefined rule(s), recommendation(s), viewer positioning, and/or any other relevant contextual input can factor into a decision as to a provisional curve profile to apply, and in some examples the provisional curve profile establishes a general guideline for the curvature, subject to tailoring (e.g. based on viewer positioning, what specific user(s) are viewing the content, etc.).

Figure 4A:
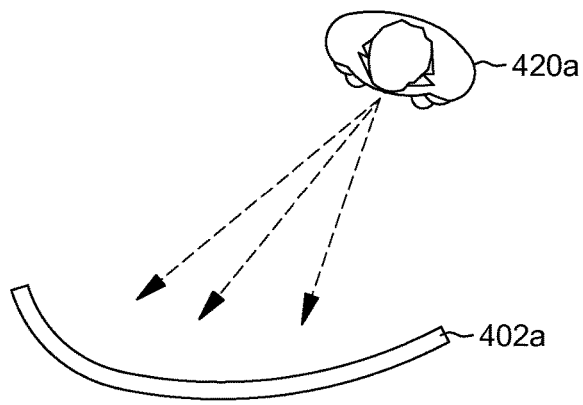
FIGS. 4A-4B provide examples of how viewer positioning can influence determination of a curve profile to apply in association with presentation of content on a flexible display, in accordance with aspects described herein.
Figure 4B:
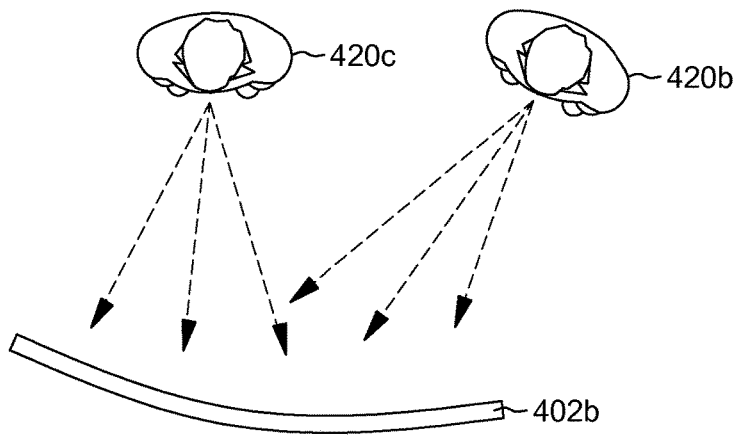

Examples of how viewer positioning can influence the determination of a curve profile to apply in association with presentation of content on a flexible display is provided in FIGS. 4A and 4B. The depictions in FIGS. 4A and 4B are from an overhead perspective, with arrows representing a viewer's line of sight. Consider a scenario where a predefined rule and/or recommendation indicates a concave, symmetrical curve assuming the viewer is centered in a left-right direction with respect to the flexible display. In that case, the curve to apply looks like that of FIG. 2B. FIG. 4A depicts a slightly modified version of that scenario, where a single viewer 420a views the content on flexible display 402a from an off-centered position. The device can detect this positioning and recognize that the indicated curve profile is to be adjusted. The determined curve profile to apply in this case is an adjusted version of the curve profile indicated by the rule(s)/recommendation. Here, the adjustment to this provisional curve profile increases curvature of the portion of the display on the right side of viewer 420a, and decreases the curvature of the portion of the display on the right side of viewer 420a. The goal of the adjustment may be to deliver to the user the same or substantially same visual effect that would be provided by the symmetrical curve profile to a viewer viewing the content from the centered position.

The addition of other viewers to the scenario of FIG. 4A may affect the adjustments made to the provisional curve profile. Referring to FIG. 4B, another viewer 420c viewing from a substantially centered position is present in addition to viewer 420b who views the display from an off-centered position. The determined curve profile may account for the viewing angles of both viewers and provide for some compromise between the indicated symmetrical curve profile, for use with a single, centered viewer, and the curve profile of FIG. 4A, for a single, off-centered viewer. This compromise can be determined using any appropriate technique. A simple example computes an average curvature for a given portion of the display across each of the viewing angles of all viewers and selects that average as the curvature to apply to the portion, though many other approaches of varying complexity are possible.

Thus, the curve profile of FIG. 4B includes a curvature on the right side of display 402b greater than that provided by the symmetrical curve profile (FIG. 2B), in order to account for the off-centered positioning of viewer 420b, but less than the curve profile of FIG. 4A because of the presence of viewer 420c. A curvature on the left portion of the display may be slightly greater in FIG. 4B than in FIG. 4A to account for the viewing angle of viewer 420c.

In some embodiments, positioning of viewer(s) is tracked continuously or periodically during presentation of content and the curve profile is dynamically updated based on the tracking. The determination of the curve profile to apply may be re-performed based on detecting a significant enough change in viewer positioning or presence as the content is presented and the curve profile may be changed accordingly.

A specific embodiment of aspects described herein is now provided. Initially, during or after manufacture of a smart television (commonly known as a "smart TV") with a flexible display, multiple electroactive polymer (EAP) strips are affixed at the backside of the flexible display. One or more electrical circuits are provided around the EAP strips to actuate the strips. The smart TV includes a computer system having at least a processor and memory storing software installed on the computer system. The software executes to track curve profiles applied or selected by the user(s) along with their viewing locations. A camera installed in the smart TV assists by tracking users' viewing positions. The smart TV maps viewing location(s) with curve profile(s). This can be done through machine learning/training using tracking data obtained by the smart TV. Curve profile(s) with respect to different viewing location(s) can be preconfigured and/or trained based on users' viewing data. Upon selection of content to present on the smart TV, software installed in the smart TV analyzes the content, and/or content context (or this is analyzed by a server of a television service provider providing the selected content) and data is communicated for applying an appropriate curve profile. A curve profile is identified to be applied to the flexible display. The identification of the curve profile can be based in part (or in whole, in some embodiments) on viewing data provided by a social network. Once the software installed in the smart TV determines the curve profile to apply in association with the presentation of that content, the software can directly or indirectly drive the creation of the appropriate electric fields to apply to the electrical circuits around the EAP strips. Mappings or other indications of the electric fields to apply for a particular curve profile assist in this. For instance, a mapping may identify a particular curve profile and/or magnitude of curvature for a portion of a curve profile together with an indication of the appropriate electric field for achieving that profile of magnitude of curvature at that portion. The appropriate electric fields are then applied to the EAP strips, which bend to provide the curve profile that the smart TV determined to apply to the flexible display.

Figure 5:
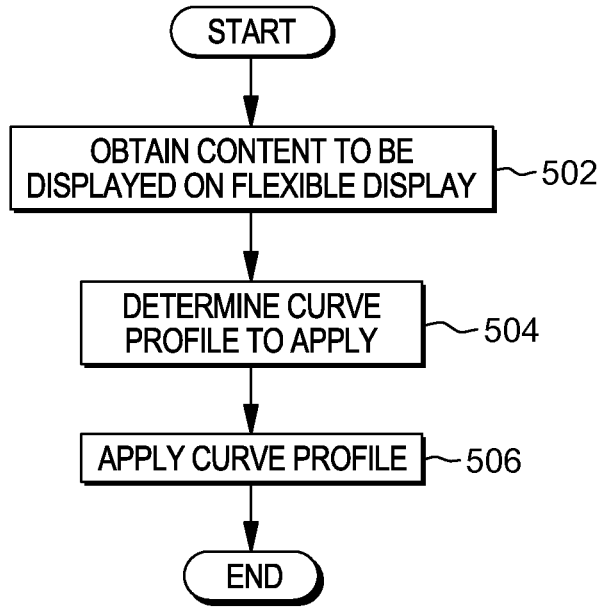
FIG. 5 depicts an example process for determining and applying a curve profile to a flexible display in association with presentation of content on the flexible display, in accordance with aspects described herein.
Figure 6:
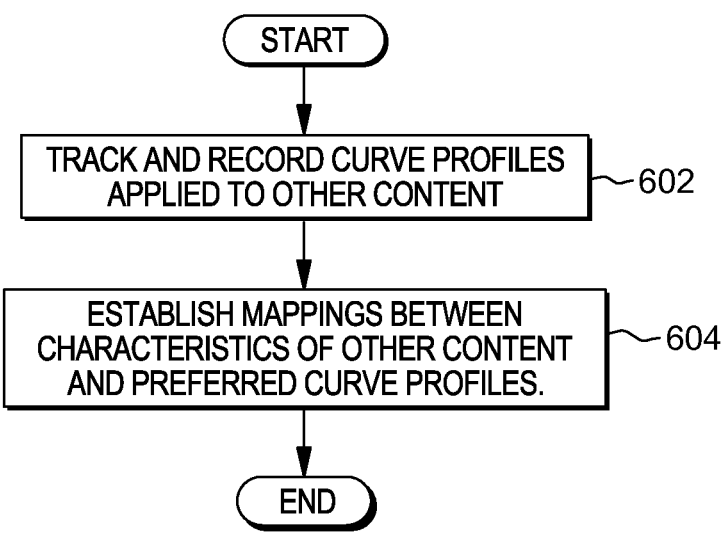
FIG. 6 depicts an example process for building predefined rules, in accordance with aspects described herein.
Figure 7:
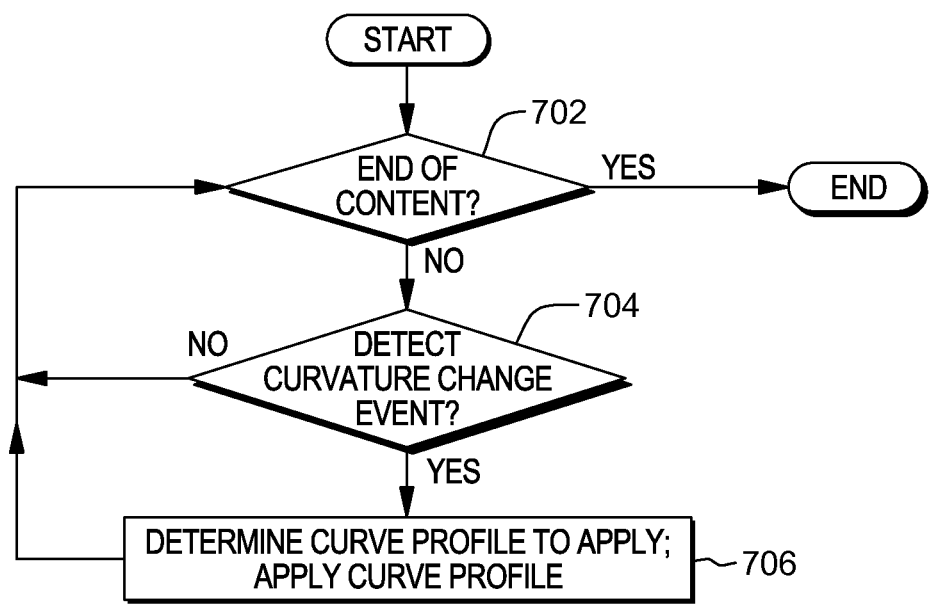
FIG. 7 depicts an example process for dynamically changing a curve profile of a flexible display from one curve profile to another curve profile during presentation of the content, in accordance with aspects described herein.

Accordingly, FIGS. 5-7 depict example processes in accordance with aspects described herein. FIG. 5 depicts an example process for determining and applying a curve profile to a flexible display in association with presentation of content on the flexible display. The process begins by obtaining content to be presented on the flexible display (502). Content refers to digital content. As examples, the content comprises one or more media files, such as pictures, videos, or audio, which is provided from a local or remote device, and/or one or more streaming media, such as a television feed or streaming media from an internet service provider, as examples. The process then automatically determines a curve profile to apply to the flexible display in association with presentation of the content on the flexible display (504). In some embodiments, the automatically determining is based at least in part on an analysis of the content to be presented. The analysis may have been prior-conducted (e.g. by a content provider by other users, or devices and/or computer systems of these entities) or may be conducted in real-time or near real time with respect to the presentation of the content on the display. Additionally or alternatively, the analysis may or may not be performed by one or more devices performing the process of FIG. 5. For instance, the analysis may be performed by a local or remote device, and results of the analysis may be passed to the device performing the automatically determining.

The automatically determining the curve profile can use a set (one or more) pf predefined rules to guide the determination of the curve profile. One or more of the predefined rules may suggest, indicate, or at least partially define the curve profile, or may offer data used by a device to define the curve profile, as examples. In some embodiments, the pre- defined rule(s) are built by a device performing aspects of the process of FIG. 5. Additionally or alternatively, one or more predefined rule(s) may be obtained from another source, such as a provider or creator of the content. FIG. 6 depicts an example process for building predefined rules, in accordance with aspects described herein.

Turning to FIG. 6, curve profiles applied to other content may be tracked by a device on which the content is presented, or another device, for example (602). Then, mappings can be established between individual characteristics of that other content and preferred curve profiles to be applied for content of/having those individual characteristics (604). A mapping maps curve profile(s) to content characteristic(s) so that when other content sharing those characteristic(s) is identified, the mapping suggests curve profile(s) to apply to that other content. One or more mappings can be included in, with, or as part of a predefined rule.

Referring back to FIG. 5, analysis of the content may identify characteristics of the content, such as characteristics about the video, images, and/or audio of the content. The automatically determining the curve profile can include comparing identified characteristics of the content to mapping(s) provided by the predefined rules.

As part of the automatically determining the curve profile, magnitudes of curvature can be programmatically identified based on the analysis of the content. The magnitudes of curvature represent curvatures to apply to curvature areas of the flexible display.

Once the curve profile to apply has been determined, it is applied to the flexible display in association with the presentation of the content thereon (506). As an example, signal(s) are provided to actuator(s), where provision of the signals and the resultant actuation of the actuators flexes the flexible display at each curvature area to the respective identified magnitude of curvature.

In some embodiments, the content to be presented is obtained with one or more recommended curve profiles to apply to the flexible display in association with the presentation of the content on the flexible display. The recommended curve profile(s) may be associated with the content by a provider and/or creator of the content, and the determined curve profile to apply may be at least partially based on the recommended curve profile(s). For instance, the curve profile may be exactly as it was recommended as part of the content. In other examples, a recommended curve profile is a general or generic recommendation that require tweaking for the specific application, such as display size, ambient lighting, or any other characteristic. Recommended curve profile(s) are, in some embodiments, provided with the content as metadata of the content.

In addition to the above, or as an alternative, presence and positioning of viewers in an area proximate the flexible display (e.g. potential viewers in the vicinity of the display) may be identified and used in the determination of a curve profile to apply. For instance, instead of, or in addition to, the analysis of the content, the curve profile to apply can be determined based on how viewing angles and number of viewers. In some embodiments, a provisional curve profile to apply is selected, such as based on predefined rules or a recommendation, and the provisional curve profile is modified or tailored based on viewing location(s) of the viewer(s). The modifying may therefore provide the curve profile that is actually applied to the flexible display.

In some embodiments, the curve profile being applied to a flexible display is dynamically modified or updated as the content is presented. FIG. 7 depicts an example process for dynamically changing curve profile of a flexible display from one curve profile to another curve profile during presentation of the content, in accordance with aspects described herein. In this regard, a determined curve profile to apply may be a first curve profile to apply in association with presentation of a first portion of the content on the flexible display. From there, a process can be performed that may change, or replace, that curve profile as the content is presented if the determination determines a different curve profile is appropriate. This provides an ability for the curve profile of the flexible display to adapt to the changing characteristics of the content presented across a period of time as it is presented. The process of FIG. 7 begins based on commencement of content playback/presentation and may run in a loop until an end of the content or other stoppage point is reached. Thus, an inquiry is made as to whether the end (or stoppage) has been encountered (702). If so, the process ends. Otherwise, the process continues by determining whether a curvature change event is detected (704). Curvature change events can be identified and tagged in the content by pre-embedding a marker, tag, or other indicator with the content, or may be identified dynamically as the content is presented. The changing characteristics of the content being presented across a period of time can be analyzed to determine that a substantially different curve profile may be warranted. If so, a curvature change event is raised. An example curvature change event occurs with a scene change. Additionally or alternatively, a curvature change event could be based on a change in the presence of viewer(s) of the content. For instance, viewer movement may be continuously tracked during presentation of the content and movement to a new position of a viewer may dictate that a different curve profile be applied. As another example, introduction of another viewer into the area near the flexible display may trigger a curvature change event. If a curvature change event is detected, it may be determined to apply a second curve profile in association with presentation of a second portion (i.e. portion immediately following the portion prior to the change event) of the content on the flexible display (706). In some embodiments, it is determined that the appropriate curve profile to apply remains the prior curve profile, in which no change is effected. In other embodiments, a change is effected, in which the first curve profile (previously applied) is different than the second curve profile (applied based on the curvature change event).

In an embodiment in which curvature change events are pre-marked for the content, the system can optionally analyze the content and identify these beforehand or may recognize them dynamically in real time as they occur. In any case, curve profile adjustment may be automatically triggered at the appropriate time(s) as the curvature change events are raised.

Processes described herein may be performed by one or more computer systems. In some examples, such a computer system that performs process(es) described herein is a computer system that is part of, includes, or uses a flexible display or apparatus into which the flexible display is incorporated. In other examples, a remote computer system in communication with such computer system performs process(es) described herein. As a third possibility, a combination of the (i) computer system including/using the flexible display and (ii) remote computing system(s) perform process(es) described herein.

Figure 8:
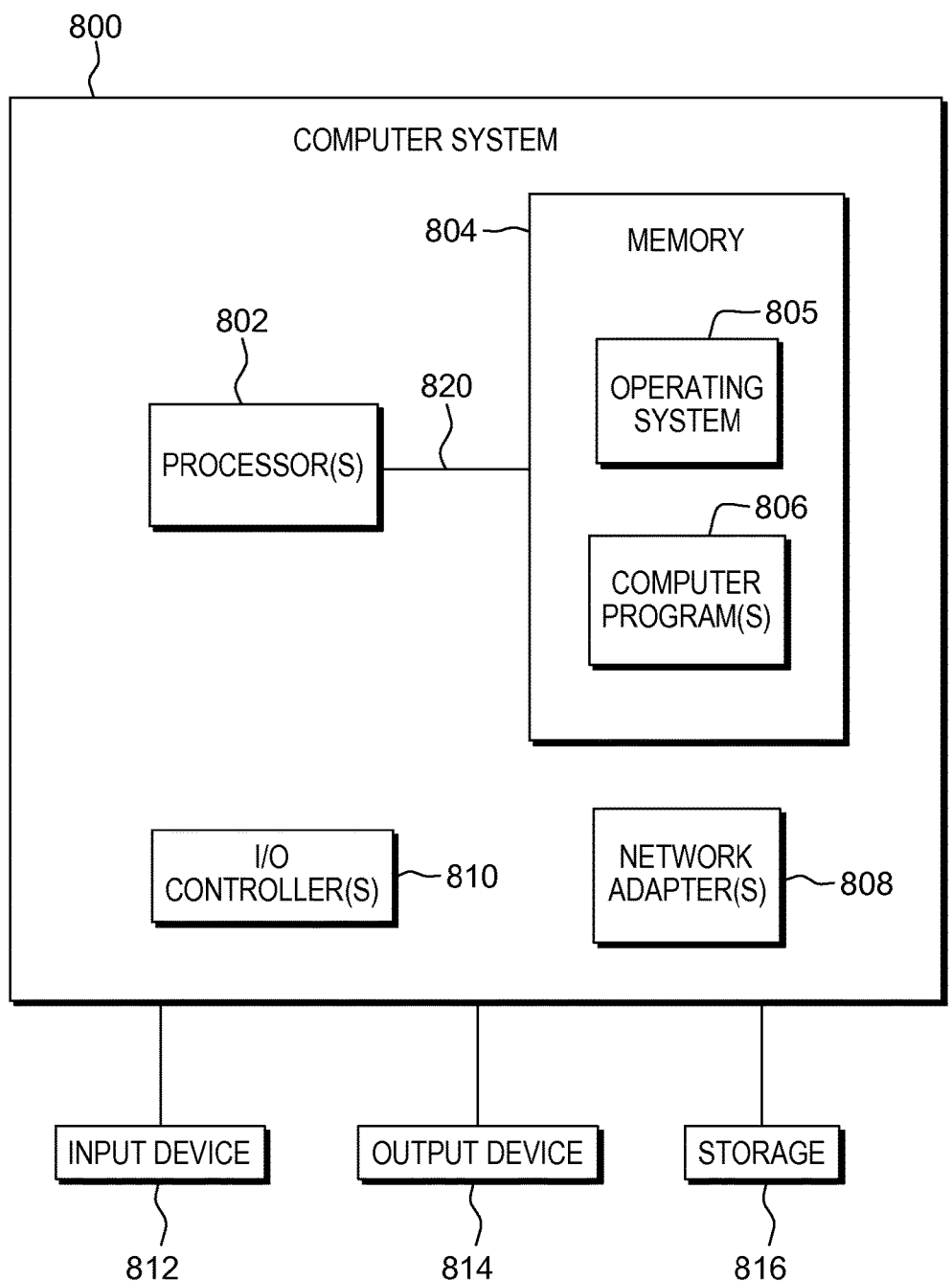
FIG. 8 depicts one example of a computer system to incorporate and use aspects described herein.

FIG. 8 depicts one example of a computer system to incorporate and use aspects described herein. A computer system may also be referred to herein as a processing device/system or computing device/system, or simply a computer. Computer system 800 may be based on various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 800 is suitable for storing and/or executing program code and includes at least one processor 802 coupled directly or indirectly to memory 804 through, e.g., a system bus 820. In operation, processor(s) 802 obtain from memory 804 one or more instructions for execution by the processors. Memory 804 may include local memory employed during actual execution of the program code, bulk storage, and cache memories which provide temporary storage of at least some program code in order to reduce the number of times code must be retrieved from bulk storage during program code execution. A non-limiting list of examples of memory 804 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 804 includes an operating system 805 and one or more computer programs 806, for instance programs to perform aspects described herein.

Input/Output (I/O) devices 812, 814 (including but not limited to displays, such as flexible touchscreen displays, microphones, speakers, accelerometers, gyroscopes, magnetometers, light sensors, proximity sensors, GPS devices, cameras, etc.) may be coupled to the system either directly or through I/O controllers 810.

Network adapters 808 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 808 used in computer system.

Computer system 800 may be coupled to storage 816 (e.g., a non-volatile storage area, such as magnetic disk drives, optical disk drives, a tape drive, etc.), having one or more databases. Storage 816 may include an internal storage device or an attached or network accessible storage. Computer programs in storage 816 may be loaded into memory 804 and executed by a processor 802 in a manner known in the art.

The computer system 800 may include fewer components than illustrated, additional components not illustrated herein, or some combination of the components illustrated and additional components. Computer system 800 may include any computing device known in the art, such as a mainframe, server, personal computer, workstation, laptop, handheld or mobile computer, tablet, wearable device, telephony device, network appliance, virtualization device, storage controller, etc.

Figure 9:
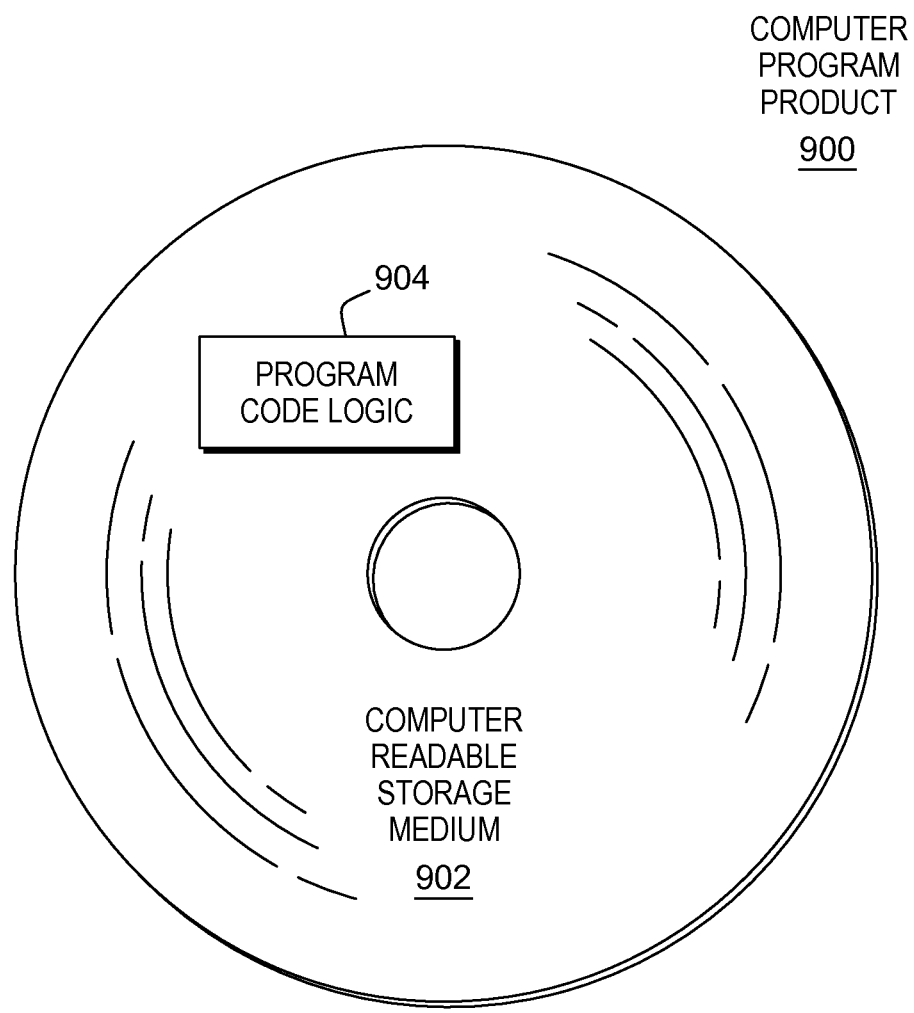
FIG. 9 depicts one embodiment of a computer program product.

Referring to FIG. 9, in one example, a computer program product 900 includes, for instance, one or more computer readable storage media 902 to store computer readable program code means, logic and/or instructions 904 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
tracking curve profiles applied to one or more flexible displays by one or more users in association with presentation of different digital media on the one or more flexible displays;
building predefined rules base on the tracking, the predefined rules defining preferred curve profiles based on curves applied to the one or more flexible displays in presenting the different digital media and comprising mappings between individual characteristics of different digital media and the preferred curve profiles;
storing the predefined rules as candidates for selection to apply in association with presentation of other digital media;
obtaining a first digital media to be presented on a flexible display;
automatically determining a curve profile to apply to the flexible display in association with presentation of the first digital media on the flexible display, the automatically determining being based at least in part on an analysis of the first digital media to be presented, wherein the automatically determining the curve profile comprises:
comparing identified characteristics of the first digital media to at least one mapping provided by the stored predefined rules;
identifying a predefined rule, of the stored predefined rules and based on the comparing, having one or more mappings of digital media characteristics that correspond to the identified characteristics of the first digital media, the digital media characteristics being those shared with second digital media, different from the first digital media, the second digital media being at least a subset of the different digital media presented on the one or more flexible displays; and
selecting the preferred curve profile of the identified predefined rule, wherein the automatically determined curve profile to apply is the selected preferred curve profile or is determined based on the selected preferred curve profile; and
applying the automatically determined curve profile to the flexible display in association with the presentation of the first digital media on the flexible display.

2. The method of claim 1, wherein a predefined rule of the predefined rules is obtained from a provider of the first digital media.

3. The method of claim 1, wherein the automatically determining the curve profile comprises programmatically identifying, based on the analysis of the first digital media, a plurality of magnitudes of curvature to apply to a plurality of curvature areas of the flexible display.

4. The method of claim 3, wherein the applying the automatically determined curve profile comprises providing one or more signals to one or more actuators, the providing the one or more signals actuating the one or more actuators to flex the flexible display at the plurality of curvature areas to the plurality of magnitudes of curvature.

5. The method of claim 1, wherein the first digital media to be presented is obtained with one or more recommended curve profiles to apply to the flexible display in association with the presentation of the first digital media on the flexible display, the one or more recommended curve profiles being associated with the first digital media by a provider or viewer of the first digital media, and wherein the automatically determined curve profile to apply is determined based at least partially on the one or more recommended curve profiles.

6. The method of claim 5, wherein the one or more recommended curve profiles are provided with the first digital media as metadata of the first digital media.

7. The method of claim 1, wherein the automatically determined curve profile comprises a first curve profile to apply in association with presentation of a first portion of the first digital media on the flexible display, and wherein the method further comprises:
detecting, during presentation of the first digital media, a curvature change event based on a change in the first digital media between the first portion of the first digital media and a second portion of the first digital media; and
automatically determining a second curve profile to apply, during the presentation of the first digital media, in association with presentation of the second portion of the first digital media on the flexible display, the first curve profile being different than the second curve profile.

8. The method of claim 1, wherein the method further comprises identifying distribution of one or more viewers of the first digital media in an area proximate the flexible display, and wherein the automatically determining the curve profile comprises selecting the preferred curve profile as a provisional curve profile to apply, and modifying the provisional curve profile based on one or more viewing locations of the one or more viewers, the modifying providing the automatically determined curve profile to apply.

9. A computer program product comprising:
a computer readable storage medium readable by a processing circuit and storing instructions for execution by the processing circuit for performing a method comprising:
tracking curve profiles applied to one or more flexible displays by one or more users in association with presentation of different digital media on the one or more flexible displays;
building predefined rules based on the tracking, the predefined rules defining preferred curve profiles based on curves applied to the one or more flexible displays in presenting the different digital media and comprising mapping between individual characteristics of the different digital media and the preferred curve profiles;
storing the predefined rules as candidates for selection to apply in association with presentation of the other digital media;
obtaining a first digital media to be presented on a flexible display;
automatically determining a curve profile to apply to the flexible display in association with presentation of the first digital media on the flexible display, the automatically determining being based at least in part on an analysis of the first digital media to be presented, wherein the automatically determining the curve profile comprises:
- comparing identified characteristics of the first digital media to at least one mapping provided by the stored predefined rules;
- identifying a predefined rule, of the stored predefined rules and based on the comparing, having one or more mappings of digital media characteristics that correspond to the identified characteristics of the first digital media, the digital media characteristics being those shared with second digital media, different from the first digital media, the second digital media being at least a subset of the different digital media presented on the one or more flexible displays; and
- selecting the preferred curve profile of the identified predefined rule, wherein the automatically determined curve profile to apply is the selected preferred curve profile or is determined based on the selected preferred curve profile; and
applying the automatically determined curve profile to the flexible display in association with the presentation of the first digital media on the flexible display.

10. The computer program product of claim 9, wherein a predefined rule of the predefined rules is obtained from a provider of the first digital media.

11. The computer program product of claim 9, wherein the first digital media to be presented is obtained with one or more recommended curve profiles to apply to the flexible display in association with the presentation of the first digital media on the flexible display, the one or more recommended curve profiles being associated with the first digital media by a provider or viewer of the first digital media, and wherein the automatically determined curve profile to apply is determined based at least partially on the one or more recommended curve profiles.

12. The computer program product of claim 9, wherein the automatically determined curve profile comprises a first curve profile to apply in association with presentation of a first portion of the first digital media on the flexible display, and wherein the method further comprises:
- detecting, during presentation of the first digital media, a curvature change event based on a change in the first digital media between the first portion of the first digital media and a second portion of the first digital media; and
- automatically determining a second curve profile to apply, during the presentation of the first digital media, in association with presentation of the second portion of the first digital media on the flexible display, the first curve profile being different than the second curve profile.

13. The computer program product of claim 9 wherein the method further comprises identifying distribution of one or more viewers of the first digital media in an area proximate the flexible display, and wherein the automatically determining the curve profile comprises selecting the preferred curve profile as a provisional curve profile to apply, and modifying the provisional curve profile based on one or more viewing locations of the one or more viewers, the modifying providing the automatically determined curve profile to apply.

14. A computer system comprising:
- a memory; and
- a processor in communication with the memory, wherein the computer system is configured to perform a method, the method comprising:
  - tracking curve profiles applied to one or more flexible displays by one or more users in association with presentation of different digital media on the one or more flexible displays;
  - building predefined rules based on the tracking, the predefined rules defining preferred curves profiles based on the curves applied to the one or more flexible displays in presenting the different digital media and comprising mapping between individual characteristics of the different digital media and the preferred curve profiles;
  - storing the predefined rules as candidates for selection to apply in association with presentation of other digital media;
  - obtaining first digital media to be presented on a flexible display;
  - automatically determining a curve profile to apply to the flexible display in association with presentation of the first digital media on the flexible display, the automatically determining being based at least in part on an analysis of the first digital media to be presented, wherein the automatically determining the curve profile comprises:
    - comparing identified characteristics of the first digital media to at least one mapping provided by the stored predefined rules;
    - identifying a predefined rule, of the stored predefined rules and based on the comparing, having one or more mappings of digital media characteristics that correspond to the identified characteristics of the first digital media, the digital media characteristics being those shared with second digital media, different from the first digital media, the second digital media being at least a subset of the different digital media presented on the one or more flexible displays; and
    - selecting the preferred curve profile of the identified predefined rule, wherein the automatically determined curve profile to apply is the selected preferred curve profile or is determined based on the selected preferred curve profile; and
  - applying the automatically determined curve profile to the flexible display in association with the presentation of the first digital media on the flexible display.

15. The computer system of claim 14, wherein the first digital media to be presented is obtained with one or more recommended curve profiles to apply to the flexible display in association with the presentation of the first digital media on the flexible display, the one or more recommended curve profiles being associated with the first digital media by a provider or viewer of the first digital media, and wherein the automatically determined curve profile to apply is determined based at least partially on the one or more recommended curve profiles.

16. The computer system of claim 14, wherein the method further comprises identifying distribution of one or more viewers of the first digital media in an area proximate the flexible display, and wherein the automatically determining the curve profile comprises selecting the preferred curve profile as a provisional curve profile to apply, and modifying the provisional curve profile based on one or more viewing locations of the one or more viewers, the modifying providing the automatically determined curve profile to apply.

* * * * *